(12) United States Patent
Heber

(10) Patent No.: US 7,347,316 B2
(45) Date of Patent: Mar. 25, 2008

(54) SPIRAL CONVEYOR BELT DRIVE SYSTEM

(76) Inventor: Gerald J. Heber, 16108 SE. 24th St., Bellevue, WA (US) 98008

( * ) Notice: Subject to any disclaimer, the term of this patent is extended or adjusted under 35 U.S.C. 154(b) by 0 days.

(21) Appl. No.: 10/970,776

(22) Filed: Oct. 20, 2004

(65) Prior Publication Data

US 2005/0082145 A1 Apr. 21, 2005

Related U.S. Application Data

(60) Provisional application No. 60/513,160, filed on Oct. 21, 2003.

(51) Int. Cl.
*B65G 27/02* (2006.01)
*B65G 13/02* (2006.01)
*B65G 21/18* (2006.01)

(52) U.S. Cl. ........................ 198/778; 198/756
(58) Field of Classification Search ................ 198/778, 198/756
See application file for complete search history.

(56) References Cited

U.S. PATENT DOCUMENTS

| | | | |
|---|---|---|---|
| 3,348,659 A * | 10/1967 | Roinestad | 198/778 |
| 3,938,651 A | 2/1976 | Alfred et al. | 198/136 |
| 4,564,282 A | 1/1986 | Shenoy | 355/3 |
| 4,565,282 A | 1/1986 | Olsson et al. | 198/778 |
| 4,850,475 A | 7/1989 | Lupo et al. | 198/778 |
| 4,858,750 A | 8/1989 | Cawley | 198/778 |
| 4,899,871 A | 2/1990 | Olsson | 198/778 |
| 5,105,934 A * | 4/1992 | Cawley | 198/778 |
| 5,190,143 A * | 3/1993 | Froderberg et al. | 198/778 |
| 5,247,810 A | 9/1993 | Fenty | 62/374 |
| 5,277,301 A | 1/1994 | Fenty | 198/778 |
| 5,335,779 A * | 8/1994 | Negrete | 198/756 |
| 5,350,056 A | 9/1994 | Hager | 198/778 |
| 5,458,228 A | 10/1995 | Olsson | 198/778 |
| 5,460,260 A * | 10/1995 | Ochs et al. | 198/778 |
| 6,062,375 A * | 5/2000 | Pupp | 198/778 |
| 6,062,641 A * | 5/2000 | Suzuki et al. | 297/180.1 |
| 6,092,641 A * | 7/2000 | Draghetti | 198/406 |
| 6,237,750 B1 * | 5/2001 | Damkjaer et al. | 198/778 |
| 6,257,392 B1 * | 7/2001 | Graham | 198/396 |
| 6,335,779 B1 * | 1/2002 | Morii et al. | 349/155 |
| 6,564,930 B1 | 5/2003 | Colding-Kristensen et al. | 198/778 |
| 2004/0011627 A1 * | 1/2004 | Palmaer et al. | 198/778 |

* cited by examiner

*Primary Examiner*—Gene O. Crawford
*Assistant Examiner*—Ramya G. Prakasam
(74) *Attorney, Agent, or Firm*—Dean A. Craine

(57) ABSTRACT

An improved spiral conveyor self-stacking drive system designed to increase the life of a multiple link conveyor belt by reducing the stresses exerted on the belt when disposed in a spiral configuration. The drive system includes a conical guide ring upon which the belt is wound when disposed in a spiral configuration. During use, the belt is tightly wrapped around the guide ring. The slope of the conical guide ring's sidewall is sufficient so that the upper tiers are stacked slightly inward and offset over the lower tiers over the entire length of the guide ring, thus gradually reducing the lateral forces exerted on the unsupported upper tiers.

5 Claims, 2 Drawing Sheets

SPIRAL CONVEYOR BELT DRIVE SYSTEM

This utility patent application claims the benefit of the provisional patent application (Ser. No. 60/513,160), filed on Oct. 21, 2003.

BACKGROUND OF THE INVENTION

1. Field of the Invention

This invention relates to conveyor belt systems, and more particularly to self-stacking, spiral conveyor belt systems.

2. Description of the Related Art

There is shown in FIGS. 1-3, a self-stacking conveyor belt system used in the prior art. Such systems include a continuous belt coupled to a drive system (not shown) that causes the belt to form a compact spiral (also called a spiral configuration herein) generally indicated by the reference number. The continuous belt is made of interconnecting links that allow the belt to continuously move in a straight path and then wrap around a rigid guide ring, generally indicated by the reference number, to form the spiral. Various types of belts and drive assemblies are disclosed in the following twelve (12) U.S. Pat. Nos. 3,938,651; 4,564,282; 4,850,475; 4,858,750; 4,899,871; 5,105,934; 5,247,810; 5,277,301; 5,350,056; 5,458,228; 5,460,260; and 6,062,375 that are now incorporated by reference herein.

The guide ring widely used in the prior art is a cylindrical structure approximately 12 to 24 inches in height and 60 to 84 inches in diameter. The spiral is approximately 4 to 36 inches higher than the guide ring. Because the guide ring is shorter than the spiral, the upper tiers of the belt located above the guide ring are unsupported centrally. As a result, forces exerted on the belt and the unsupported upper tiers to automatically stack in an offset position towards the guide ring's center axis. Because the forces exerted on the unsupported upper tiers are relatively large, the distance the upper tiers are offset over the lower tiers is relatively large which, in turn, causes the inner belt spacers on the links located on the lower tiers to bend. When the amount of bend exceeds the fatigue limits of the spacers, cracks are created which eventually lead to breakage.

It is an object of this invention to provide an improved guide ring used with a spiral conveyor belt self-stacking drive system that reduces the stress on the links and thus breakage.

SUMMARY OF THE INVENTION

The above objective is met by a rigid, conical guide ring that replaces the cylindrical guide ring commonly used on a spiral conveyor belt, self-stacking drive system. The conical guide ring is designed to reduce the amount of stress exerted on the inner spacers on the links located on the lower tiers by the upper tiers.

More specifically, the guide ring is a conical structure with a gradual and constant sloped or tapered sidewall. The slope of the sidewall is sufficient so that the upper tiers are continuously stacked over the lower tiers and supported in a slightly offset alignment thereby reducing the amount of stress exerted on the inner belt spacers by the unsupported upper tiers. The slope of the sidewall of the cylindrical guide ring is sufficient so that tension of the section of belt entering the spiral configuration is dissipated. In the preferred embodiment, the section belt exiting the spiral configuration should be approximately zero.

DESCRIPTION OF THE PREFERRED EMBODIMENT(S)

Referring to the accompanying FIGS. 1-5, there is shown an improved guide ring 20 used with a self-stacking, spiral conveyor belt drive system specifically designed to reduce breakdowns and repairs to the belt 10 that normally occur with self-stacking, spiral conveyor belt drive systems found in the prior art that use a cylindrical guide ring.

Figure 5:
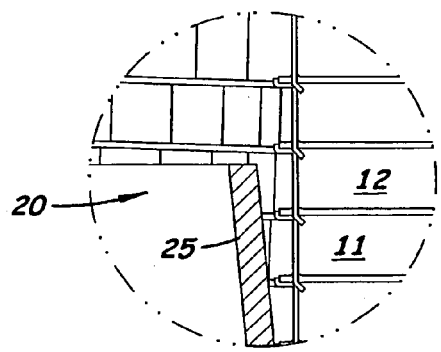
FIG. 5 is a sectional, side elevational view of the upper section of the conical guide ring showing the upper tiers being continuously stacked in an offset position over the lower tiers.

The conical guide ring 20 which is used in place of the cylindrical guide ring 8, has an outer sidewall 25 that is tapered inward as it ascends so that the diameter of the upper edge 21 is smaller than the diameter of the lower edge 22. Because the belt 10 is wound against the sidewall 25 of the conical guide ring 20 to dispose the belt 10 in a spiral configuration 9, the diameters of the upper tiers 12 of the belt 10 gradually become smaller and are stacked slightly offset and inwardly over the lower tier 11. Because the sidewall 25 is tapered, the upper tiers 12 are aligned in an offset position over the lower tiers 11 the entire height of the guide ring 20 as shown in FIG. 5. On the unsupported upper tiers 12, the amount of lateral forces exerted on the inner spacers are reduced thereby reducing belt breakage.

Figure 1:
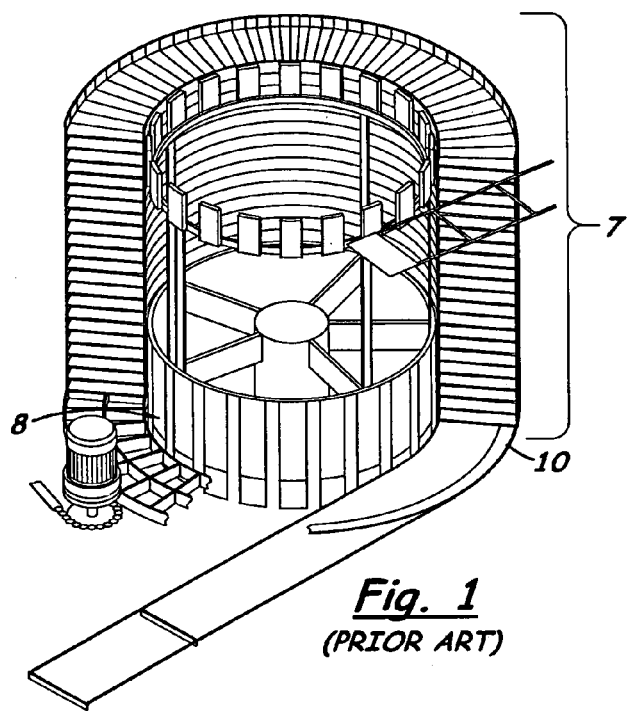
FIG. 1 is a perspective view of a spiral formed around a cylindrical guide ring used in the prior art.
Figure 2:
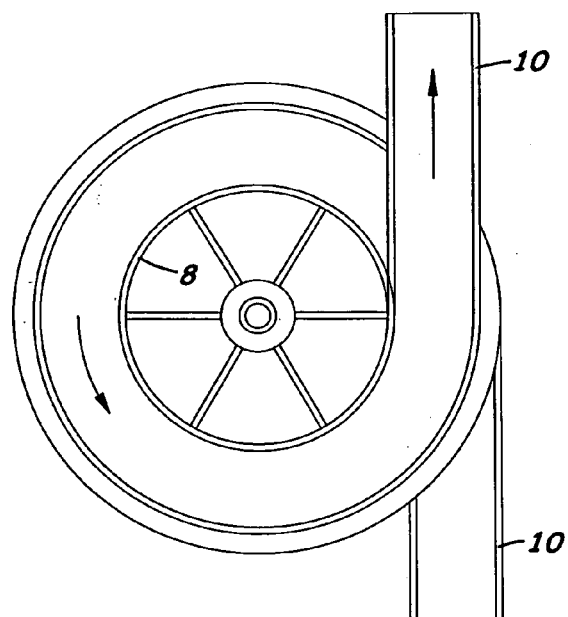
FIG. 2 is a top view of the spiral and cylindrical guide ring shown in FIG. 1.
Figure 3:
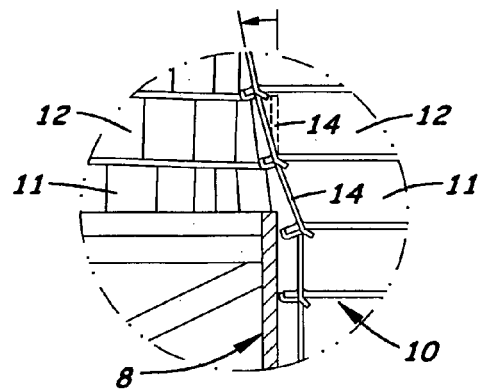
FIG. 3 is a sectional, side elevational view of the upper section of the cylindrical showing the upper tiers being stacked in an offset position over the lower tiers.
Figure 4:
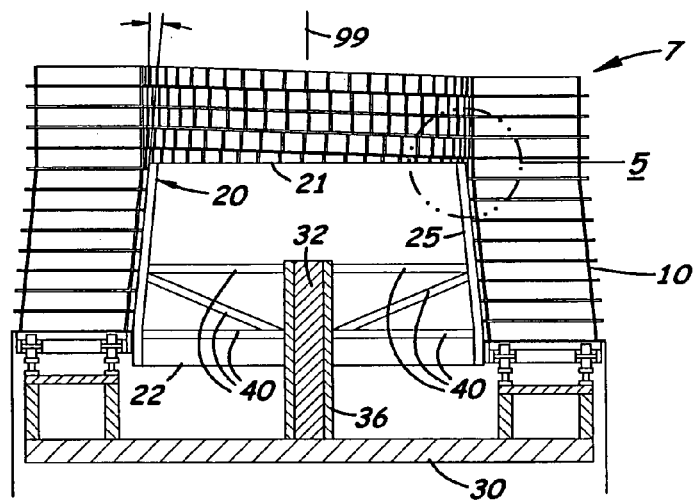
FIG. 4 is a side elevational view of the spiral created by the conical guide ring disclosed herein.

As shown in FIG. 4, the conical guide ring 20 is mounted on an elevated, rigid circular platform 30. Attached to the platform 30 is a vertically aligned post 32. Longitudinally aligned over the post 32 is a cylindrical axle 36. One or more bearings (not shown) are placed between the post 32 and axle 36 to keep the axle 36 coaxially aligned on the post 32. Disposed between the inside surface of the conical guide ring 20 and the outer surface of the cylindrical axle 36 are a plurality of radially aligned spokes 40. The spokes 40 are evenly spaced apart along the inside surface of the guide ring 20 and are coaxially aligned around the post 32 as the guide ring 20 rotates around the post 32 during use.

In the preferred embodiment, the conical guide ring 20 is made of steel or aluminum and measures approximately 12 to 24 inches in height and 48 to 84 inches in diameter along the lower edge 22. In the preferred embodiment, the sidewalls 25 are sloped inward approximately 0.5 to 2 degrees from the vertical axis 99.

During operating, a motor (not shown), moves the conveyor belt 10 under tension. The tension of the incoming section of belt 10 is typically between 50 to 150 lbs. Using the cylindrical guide ring 20, the tension of the outgoing section of belt 10 is typically between 0 and 25 lbs.

It should be understood that while the conical guide ring 20 is described as being used with a wagon driven belt system, that same principle of reducing the diameter of the belt 10 when configured in a spiral configuration 7 may be used in ball driven belt systems that use a continuous, spiral-shaped ball track structure that is reduced in diameter so that the upper tiers 12 are stacked in an offset position over the lower tier 11.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A spiral conveyor belt system, comprising:
   a. continuous conveyer belt made of a plurality of interconnected links, said belt capable of being disposed in a stacked, spiral configuration;
   b. support platform, and;
   c. a rotating conical guide ring vertically aligned on said support platform, said conical guide ring having a tapered sidewall so when said conveyor belt is wound upward and around said conical guide ring in stacked tiers, the upper tiers are offset inward over a lower tier and supported by a lower tier located directly thereunder thereby reducing the amount of tension force on said conveyor belt.

2. The belt system, as recited in claim 1, wherein said sidewall is sloped inward between 0.5 and 2 degrees from said guide ring's vertical axis.

3. The belt system, as recited in claim 1, wherein said support platform includes a post and said conical guide ring includes a cylindrical axle that is coaxially aligned over said post and a plurality of spokes disposed between the inside surface of said guide ring and said axle to coaxially aligned said conical guide ring around said post.

4. A spiral conveyor belt system include a support structure that supports a continuous conveyer belt made of a plurality of interconnected links in a spiral configuration, said support structure allowing said conveyor belt to be self stacking with the upper tiers being supported by a lower tier located directly thereunder in an offset position so that the tension on said conveyor belt is gradually reduced.

5. The spiral conveyor belt system, as recited in claim 4, wherein said support structure is a conical guide ring with tapered sidewall around which said conveyor belt is wound into a spiral configuration.

* * * * *